United States Patent [19]

Santasalo et al.

[11] Patent Number: 4,767,502
[45] Date of Patent: Aug. 30, 1988

[54] STEAM GENERATOR IN A MULTI-STAGE DISTILLING APPARATUS

[75] Inventors: Lauri Santasalo; Esko Santasalo, both of Helsinki, Finland

[73] Assignee: Oy Santasalo-Sohlberg AB, Finland

[21] Appl. No.: 52,452

[22] Filed: May 20, 1987

[30] Foreign Application Priority Data

May 26, 1986 [FI] Finland .................................. 862213

[51] Int. Cl.$^4$ ............................................. B01D 1/26
[52] U.S. Cl. ....................................... 202/174; 202/177;
202/182; 202/197; 202/202; 202/237; 159/17.1;
159/DIG. 8; 203/23; 203/100; 203/DIG. 8;
203/DIG. 9; 122/4 A; 122/13 A; 219/284;
219/288
[58] Field of Search ............... 202/174, 237, 176, 177,
202/182, 197, 202, 235; 159/28.5, 17.1, DIG. 8;
203/100, 10, 23, 40, 21, 22, DIG. 8, DIG. 9;
55/183; 122/13 A, 4 A; 219/284, 285, 286, 287,
290, 288

[56] References Cited

U.S. PATENT DOCUMENTS

| | | | |
|---|---|---|---|
| 1,067,010 | 7/1913 | Dunn | 159/27.1 |
| 1,451,863 | 4/1923 | Clark | 122/13 A |
| 1,534,079 | 4/1925 | Russell et al. | 219/290 |
| 2,379,519 | 7/1945 | Hall | 203/23 |
| 2,389,789 | 11/1945 | Latham, Jr. | 203/10 |
| 3,200,050 | 8/1965 | Hogan et al. | 203/11 |
| 3,488,474 | 1/1970 | Saunders | 219/287 |
| 3,808,400 | 4/1974 | Cornella et al. | 219/284 |
| 3,884,767 | 5/1975 | Pottharst, Jr. | 159/DIG. 8 |
| 3,907,629 | 9/1975 | Machida | 159/DIG. 31 |
| 3,926,739 | 12/1975 | Izumi | 202/174 |
| 4,230,536 | 10/1980 | Sech | 159/28.1 |
| 4,430,555 | 2/1984 | Stokes | 122/4 A |
| 4,536,258 | 8/1985 | Huhta-Koivisto | 202/237 |

FOREIGN PATENT DOCUMENTS

| | | | |
|---|---|---|---|
| 0677583 | 1/1964 | Canada | 159/DIG. 8 |
| 0685719 | 1/1953 | United Kingdom | 202/174 |
| 1353444 | 5/1974 | United Kingdom . | |
| 1248628 | 8/1986 | U.S.S.R. | 159/13.2 |

Primary Examiner—David L. Lacey
Assistant Examiner—Virginia Manoharan
Attorney, Agent, or Firm—Steinberg & Raskin

[57] ABSTRACT

A steam generator, especially a pure steam generator, having a feed line for conducting feed water to the same, an electrode system for heating the feed water, a steam outlet for removing generated steam, and a separating space in a lower part of the generator 10, along with a droplet separator through which the steam that has been generated is disposed to flow from the separating space to the steam outlet. Electrodes have been placed in small tubular spaces in a water space (i.e. a space receiving incoming feed water). The steam generator may be used in a multi-stage distilling apparatus by conducting the steam that has been formed to a second column or stage of the distilling apparatus, to constitute feed steam therefor.

8 Claims, 1 Drawing Sheet

U.S. Patent    Aug. 30, 1988    4,767,502
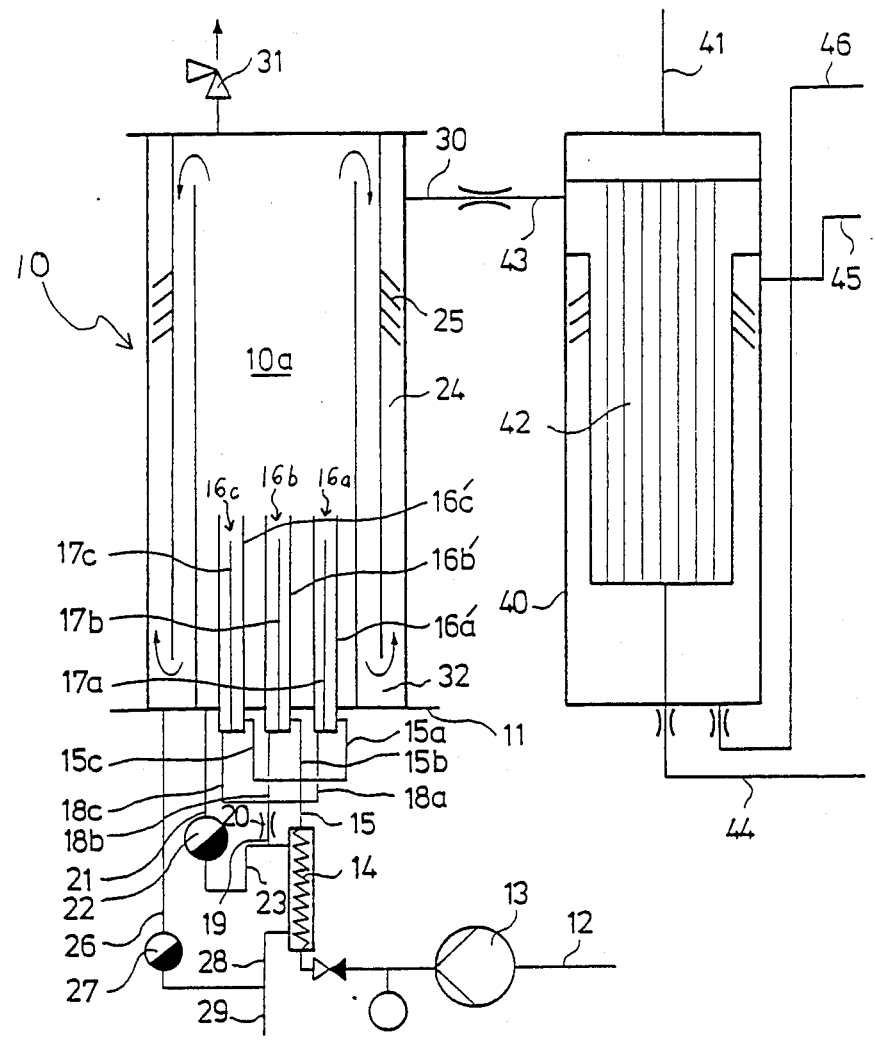

STEAM GENERATOR IN A MULTI-STAGE DISTILLING APPARATUS

BACKGROUND OF THE INVENTION

The present invention concerns a steam generator, in particular a generator for generating pure steam, which comprises a feed line for conducting feed water into the steam generator, an electrode system for heating the water, a steam outlet from the generator, a separating space in the lower part of the steam generator, and a droplet separator through which the steam that has been generated is disposed to flow from the separating space to the steam outlet.

In multi-stage distilling apparatus, steam is required for steam supply to the different columns or stages. Usually, boiler steam is used which is impure. Impure boiler steam is very appropriate for use in multi-stage distilling apparatus, because the requirement of the steam supply is to merely cause efficient heat exchange with the heat exchange tubes in the columns.

Extremely strict quality requirements are imposed on pure steam, which is used for steam sterilizing in the pharmaceutical industry. The pure steam must be absolutely free of pyrogenic impurities as well. It must be kept in mind that the drug packaging may be defective. In this case, if the pure steam used in steam sterilizing is not absolutely free of pyrogens, then the result is that such drug packaging becomes unfit for use.

A pure steam generator is, in actual fact, a distilling apparatus without a condenser, with the pure steam being, in actual fact, the same as uncondensed distillate used, for instance, in solutions for injection use.

In pure steam generators, the purity requirements have been met in a prior art design, by the feed water itself being free of pyrogens. In that case, the pure steam that is produced is naturally free of pyrogens. However, using such high quality feed water causes tremendous costs. Therefore, this prior art design is not the best possible solution, from an economical point of view.

Therefore, impure feed water is usually used in pure steam generators presently known. The feed water is conducted with the aid of a feed pump, and along a feed line, usually through a waste water heat exchanger and a heating steam heat exchanger, and by a feed water flow connector into a distribution space at the upper end of the pure steam generator. From this space, the feed water flows downwardly in heat exchange with a heat exchange tube system, while from the lower end of the pure steam generator, the steam is conducted through a centrifugal separator to the pure steam outlet. The condensate of the heating steam is conducted to the heating steam heat exchanger, and the waste water to the waste water heat exchanger, for preheating the feed water.

Presently, electrically-heated pure steam generators are also used. A resistance boiler is not applicable in connection with rapid load change conditions, which is the situation when serving autoclaves intended for steam sterilizing. At the initial phase of steam sterilizing, much steam is rapidly required for supply of the autoclave, while after a certain time, the steam requirements drop abruptly.

A resistance boiler design is slow, requiring in practice, usually 10 to 20 minutes before any steam is produced if the feed water is cold. When the steam consumption ceases, a resistance boiler continues to produce steam for several minutes, as a result of which the pressure increases. The resistance boilers are usually fitted with a safety valve which then blows, whereby the steam that is produced goes to waste.

In fact, there are only two extreme situations in functioning of a resistance boiler design. One situation is when the boiler operates at full power, while the other situation is when there is no power at all. A resistance boiler also introduces the risk that the feed water boils dry. Moreover, the useful life span of electrical resistances is shorter in resistance boilers when they are run under varying load conditions.

The resistance boiler design has been improved by a solution in which the electrodes of the electrode system intended for evaporating or vaporizing the feed water are located on the bottom of the tank in the water space. The drawbacks of this type of design known in the art are its slow operation, and a foaming problem. On the other hand, there is as a rule no risk of boiling dry. It is also a fact that in using this previously-known type of electrode, there is no possibility of achieving stepless power control, because the current intensity in relation to the water level is not adjustable.

SUMMARY OF THE INVENTION

Accordingly, it is an object of the present invention to achieve improvement over presently-known, electrically-heated steam generators.

It is a more detailed object of the present invention to provide an electrically-heated steam generator, which is fast operating and in which it is possible to implement stepless power control.

These and other objects are attained by the present invention which is directed to a steam generator comprising a housing defining a steam generating space therewithin, with a plurality of discrete, separate tubular members defining corresponding tubular spaces for receiving incoming feed liquid. Feed means are provided for conducting the feed liquid into the tubular spaces, with means for heating the feed liquid to generate the steam also being provided, and comprising electrodes situated in the tubular spaces.

The objects of the invention are thus attained with an electrically-heated steam generator which is principally characterized by the electrodes having been placed in small tubular spaces in the water space (i.e. the portion of the generator receiving the incoming feed liquid).

The steam generator of the present invention may be applied in numerous, different uses. The steam generator of the invention is particularly advantageous when it produces pure steam for steam sterilizing requirements in the pharmaceutical industry. The steam generator of the invention may, however, equally be applied in producing steam of lower quality, i.e., in producing non-pure steam. The design of the present invention is also not critical regarding the mode of separating droplets from the steam that has been formed. In other words, it is possible to apply numerous droplet separation designs known, in and of themselves, in the art, in the steam generator of the present invention.

BRIEF DESCRIPTION OF THE DRAWING

The present invention will now be described in greater detail with reference to the accompanying figure, to which the present invention is not intended to be exclusively confined. In the drawing, the figure is a schematic elevational view of an advantageous embodiment of an electrically-heated steam generator of the present invention, and the use thereof in a distilling apparatus.

DESCRIPTION OF THE PREFERRED EMBODIMENT

The pure steam generator of the present invention has generally been denoted by reference numeral 10 in the figure. The bottom of the pure steam generator 10 has been denoted by reference numeral 11, while the raw (incoming) feed water line has been denoted by reference numeral 12, and the feed pump by reference numeral 13. The feed pump 13 feeds the raw or incoming water along the feed line 12, to a heat exchanger 14, with the thus-pre-heated feed water then flowing along line 15, with the preheated feed water being divided between branch lines 15a, 15b, and 15c.

According to a basic concept of the present invention, tubular members 16a', 16b', 16c' defining comparatively small, tubular spaces 16a, 16b and 16c, have been disposed to pass through the bottom 11 of pure steam generator 10. The pre-heated or warmed feed water flows into the comparatively small, tubular spaces 16a, 16b, and 16c, by way of the respective branch lines 15a, 15b, and 15c, as illustrated. Electrodes which have been placed in the respective tubular spaces 16a, 16b, and 16c, are indicated by reference numerals 17a, 17b, and 17c, respectively. The respective tubular spaces 16a, 16b, and 16c, have been provided with drain or overflow lines 18a, 18b, and 18c respectively. The drain or overflow lines 18a, 18b, and 18c join together to form line 19, which communicates with the heat exchanger 14. A restriction 20 has been provided in the connecting line 19.

A waste water line 21 leads from the steam space 10a of the pure steam generator 10, with a condensate separator 22 being provided in the waste water line 21. The drain or overflow line 19 and the waste water line 21 join a collector line 23, which leads to the heat exchanger 14, as illustrated.

A steam-centrifuging duct 24 leads from the steam space 10a of the pure steam generator 10 and to a pure steam outlet 30, and is also provided with droplet separators 25. The liquid droplets that have been separated from the steam flow are conducted by a line 26 to a condensate separator 27, and further by a line 28 to the heat exchanger 14 or directly by a line 29 to a drain. The pure steam generator is fitted with a conventional safety device, i.e., a safety valve 31. A separation space in the lower part of the steam generator 10, which communicates with the steam space 10a the steam centrifuging duct 24, and with the line 26, has been denoted by reference numeral 32.

In the embodiment illustrated in the figure, the pure steam generator 10 has been applied for use in a distilling apparatus known, in and of itself, in the art. The second column or stage of this apparatus has been indicated by reference numeral 40. Pure steam generated in the apparatus 10 is fed to the second stage or column 40 through the steam outlet 30 and line 43, provided with a restrictor as illustrated. The feed line supplying water to be distilled to the column 40, has been indicated by reference numeral 41, while the heat exchange pipe systems have been denoted by reference numeral 42. Distillate is conducted from the column 40 in a manner known in and of itself in the art, by a product line 44, while the supply steam is conducted by a line 45 to a third column or stage of the distilling apparatus. Similarly, the feed water flows along a line 46 to the third column or stage of the distilling apparatus.

A distilling apparatus of this type is known, in and of itself, in the art, and has been presented, e.g., in Finnish Pat. No. 47,083. Therefore, reference is made to this patent regarding more detailed design of this previously-known distilling apparatus.

The pure steam generator 10 of the present invention may naturally be provided with a pressure-operated switch, which has been arranged to throttle the feed water flow rate and, at the same time, to boost the quantity of water flowing out.

The design principles of the present invention have been presented in the foregoing. It is clear to a person skilled in the art that numerous modifications thereof are feasible within the scope of the inventive concepts herein. Accordingly, the preceding description of the present invention is merely exemplary, and is not intended to limit the scope thereof in any way.

We claim:

1. A steam generator forming a first stage of a multi-stage distilling apparatus, comprising:
   a housing defining a steam generating space therewithin;
   a plurality of discrete, separate, tubular members defining tubular spaces for receiving incoming feed liquid;
   feed means for conducting feed liquid into said tubular spaces, said feed means comprise;
   a feed line;
   a plurality of branch lines for feeding the feed liquid into said steam generating space, said branch lines each connected with said feed line and a respective tubular space;
   means for heating the feed liquid to generate the steam, comprising electrodes situated in said tubular members;
   a separating space situated in a lower part of said steam generating space;
   a droplet separator communicating with said separating space and through which the generated steam is disposed to flow from said separating space, whereby liquid separated from the steam in said droplet separator collects in said separating space;
   a steam outlet connected with said droplet separator;
   a second stage of said distilling apparatus, with said steam outlet connected with said second stage, whereby the steam generated in said first stage constitutes feed steam for said second stage; and
   a heat exchanger disposed in said feed line for pre-heating the feed liquid.

2. The generator of claim 1, wherein
   said tubular spaces extend to a bottom of said steam generating space, and
   said feed means communicate with said tubular spaces at the bottom of said steam generating space.

3. The generator of claim 1, additionally comprising a waste liquid line connected with said steam generating space for removing waste liquid from the same, said waste liquid line also connected with said heat exchanger.

4. The generator of claim 3, additionally comprising a plurality of drain lines, each drain line connected with a respective tubular space at a bottom portion thereof, and said drain lines also connected with said heat exchanger.

5. The generator of claim 1, wherein said drain lines and said waste liquid line are connected upstream of said heat exchanger.

6. The generator of claim 4, additionally comprising a line connected with said separating space for removing the separated liquid therefrom, and connected with at least one of said heat exchanger and said drain lines.

7. The generator of claim 5, additionally comprising a condensate separator in said separating space line,
a condensate separator in said waste liquid line, and
a junction line connected with all said drain lines and with said waste liquid line,
and a flow restrictor situated in said junction line.

8. The generator of claim 1, additionally comprising a safety valve fitted onto said steam generating housing and connected with said steam generating space.

* * * * *